(12) United States Patent
Reed et al.

(10) Patent No.: US 10,152,703 B2
(45) Date of Patent: Dec. 11, 2018

(54) TRANSACTION SYSTEM AND METHOD (71) Applicant: NCR Corporation, Duluth, GA (US)

(72) Inventors: Michael K. Reed, Buford, GA (US);
John F. Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 153 days.

(21) Appl. No.: 14/038,161

(22) Filed: Sep. 26, 2013

(65) Prior Publication Data

US 2015/0088677 A1    Mar. 26, 2015

(51) Int. Cl.
| | |
|---|---|
| *G06Q 20/00* | (2012.01) |
| *G06Q 20/20* | (2012.01) |
| *G07G 1/00* | (2006.01) |
| *G07G 1/14* | (2006.01) |
| *G06Q 20/32* | (2012.01) |
| *G06Q 20/34* | (2012.01) |
| *G06Q 20/36* | (2012.01) |

(52) U.S. Cl.
CPC ......... *G06Q 20/202* (2013.01); *G06Q 20/204* (2013.01); *G06Q 20/206* (2013.01); *G06Q 20/208* (2013.01); *G06Q 20/209* (2013.01); *G06Q 20/3227* (2013.01); *G06Q 20/3276* (2013.01); *G06Q 20/3278* (2013.01); *G06Q 20/34* (2013.01); *G06Q 20/363* (2013.01); *G07G 1/0036* (2013.01); *G07G 1/14* (2013.01)

(58) Field of Classification Search
CPC ..... G06Q 30/00; G06Q 20/202; G06Q 20/206
USPC ...... 235/462.13; 705/16, 17, 21, 26.41, 26.8
See application file for complete search history.

(56) References Cited

U.S. PATENT DOCUMENTS

| | | | | |
|---|---|---|---|---|
| 2002/0190128 | A1* | 12/2002 | Levine | G06K 17/0022 235/462.13 |
| 2011/0231285 | A1* | 9/2011 | Englund | G06Q 30/0603 705/26.41 |
| 2012/0095853 | A1* | 4/2012 | von Bose | G06Q 20/20 705/16 |
| 2013/0262248 | A1* | 10/2013 | Kim | G07G 1/0018 705/17 |
| 2014/0279106 | A1* | 9/2014 | Smelcer | G06Q 20/36 705/21 |

OTHER PUBLICATIONS

Matt Paish, "Toshiba's new supermarket scanner recognises food", Mar. 14, 2012, Australian Food News, http://ausfoodnews.com.au/2012/03/14/toshibas-new-supermarket-scanner-%E2%80%9Crecognises-food%E2%80%9D.html (attached).*

* cited by examiner

*Primary Examiner* — Rokib Masud
(74) *Attorney, Agent, or Firm* — Schwegman, Lundberg & Woessner (57) ABSTRACT

A transaction system and method in which a customer operates a mobile device, such as a smart phone, to interact with a transaction server during a transaction at a checkout station while scanning items. An example method includes establishing by the server a connection with a mobile communication device, receiving by the server item descriptions associated with items purchased from a code reader, sending by the server prices of the items and the item descriptions to the mobile communication device for display by the mobile communication device, and receiving payment by the server from the customer for the items.

20 Claims, 6 Drawing Sheets

TRANSACTION SYSTEM AND METHOD

BACKGROUND

Self-service computer systems have replaced full-service computer systems in many business environments today. For example, self-service computer systems may be found in banking, retail, hospitality, travel, entertainment, medical, and other environments.

One example self-service computer system is disclosed in U.S. Pat. No. 5,992,570 of the assignee of the present application. The self-service computer system occupies a self-service checkout lane. A grocery or other store may choose to include a mix of full-service and self-service checkout lanes near store exits. Customers perform tasks at a self-service checkout lane that an assistant might otherwise perform. For example, customers operate barcode readers to scan the items they have selected for purchase, they place the items in bags, and they operate payment devices to pay for the items. This patent is hereby incorporated by reference.

Traditional self-checkout systems can be costly and occupy as much store space as a full-service checkout system.

Therefore, it would be desirable to provide an alternative transaction system and method that offers retailers and customers more choices for checkout.

SUMMARY

A transaction system and method is provided.

An example method includes establishing by a server a connection with a mobile communication device, receiving by the server item descriptions associated with items purchased from a code reader, sending by the server prices of the items and the item descriptions to the mobile communication device for display by the mobile communication device, and receiving payment by the server from the customer for the items.

DETAILED DESCRIPTION

Referring now to FIGS. 1-4, an example transaction system 10 is located in a grocery, merchandise, or other store. Example system 10 primarily includes server 20, mobile communication device 40, and checkout system 50.

Figure 1:
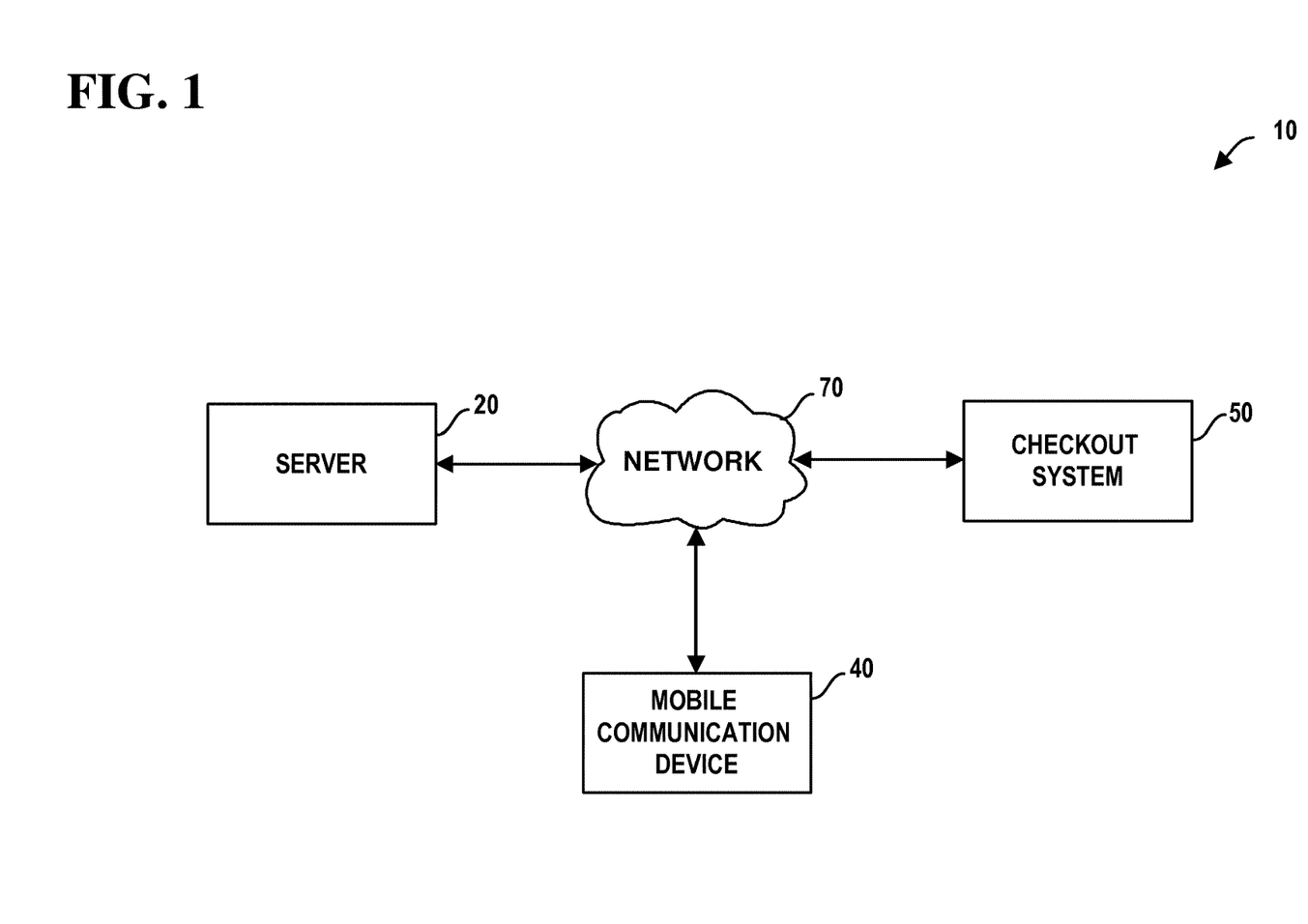
FIG. 1 illustrates a block diagram of an example transaction system.
Figure 2:
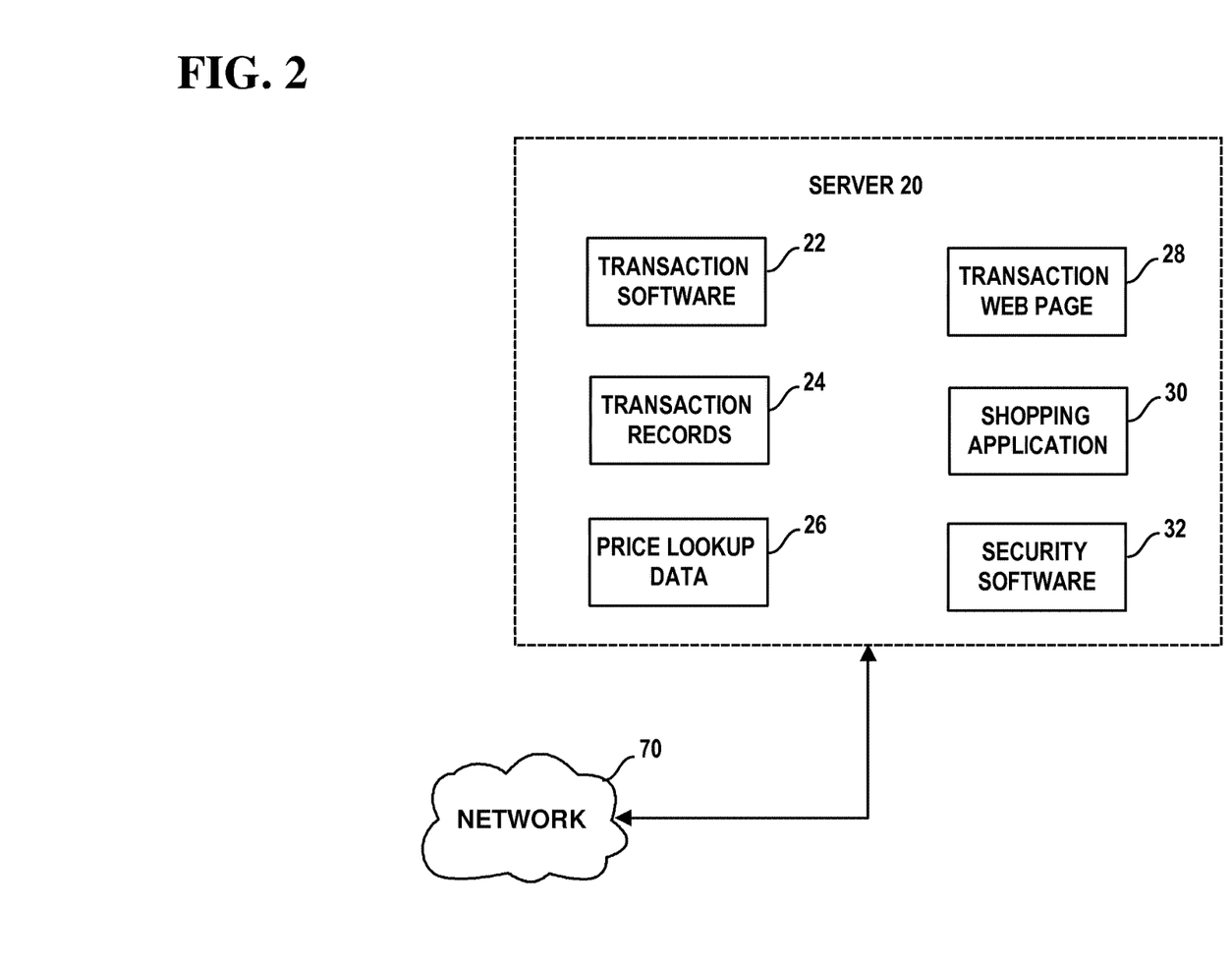
FIG. 2 illustrates a block diagram of an example server of the transaction system.

With reference to FIG. 2, server 20 may include one or more computers and/or processors, memory, program and data storage, a display, and one or more user input devices. Server 20 may execute an operating system, such as a Microsoft or Linux operating system. Server 20 additionally includes components and necessary to accomplish its purpose, such as network circuitry for connecting to network 70.

Server 20 executes transaction software 22, which interacts with mobile communication device 40 and checkout system 50 via network 70. During a transaction, transaction software 22 establishes a transaction record 24, obtains item identification information and produce weight information from checkout system 50, and determines prices from price lookup data 26.

Transaction software 22 stores the item identification information, produce weights, and prices in transaction record 24. Transaction record 24 may be temporary and deleted after the transaction is completed. In other embodiments, transaction software 22 may use the information in transaction record 24 to update a customer's loyalty profile.

Server 20 may include a backoffice computer which hosts transaction software 22 "in the cloud". Server 20 may be connected to the World Wide Web (WWW or "web") and include a web server which hosts a web site including web page, web applications and other web content. Shoppers may visit transaction web page 28 to obtain shopping application 30.

Shopping application 30 connects via network 70 to server 20. In an example embodiment, shopping application 30 may connect to server 20 through web service software of server 20 for this purpose.

As used herein, a "web service" means a software system designed to support interoperable computer to computer interaction over a network. A web service has an interface described in a machine-processable format, specifically a Web Services Description Language (WSDL). Other systems interact with the web service in a manner prescribed, for example, using SOAP (Simple Object Access Protocol) messages, typically conveyed using HTTP (Hyper Text Transfer Protocol) with an XML (eXtensible Mark-up Language) serialization in conjunction with other web-related standards. The source of this definition is http://www.w3.org/TR/ws-gloss/.

During the transaction, transaction software 22 provides transaction details such as item descriptions, weights, and prices from price lookup file 26 for display by mobile communication device 40 through shopping application 30 so that the customer may follow along as items are processed. Transaction software 22 may also send coupons, promotions, and other offerings to mobile communication device 40 to enhance the customer's experience.

Transaction software 22 may process payment from mobile communication device 40 and/or from checkout system 50. Transaction software 22 also causes a receipt to be printed at checkout system 50 or delivered to mobile communication device 40 in digital form.

Server 20 may also execute security software 32, which evaluates information from the current transaction for security risks, such as item theft and item substitution for cheaper items. For example, security software 32 may analyze images captured by an imaging barcode reader of checkout system 50. Security software 32 may send an alert to a store employee or security person when it determines that a security violation has likely occurred.

Figure 3:
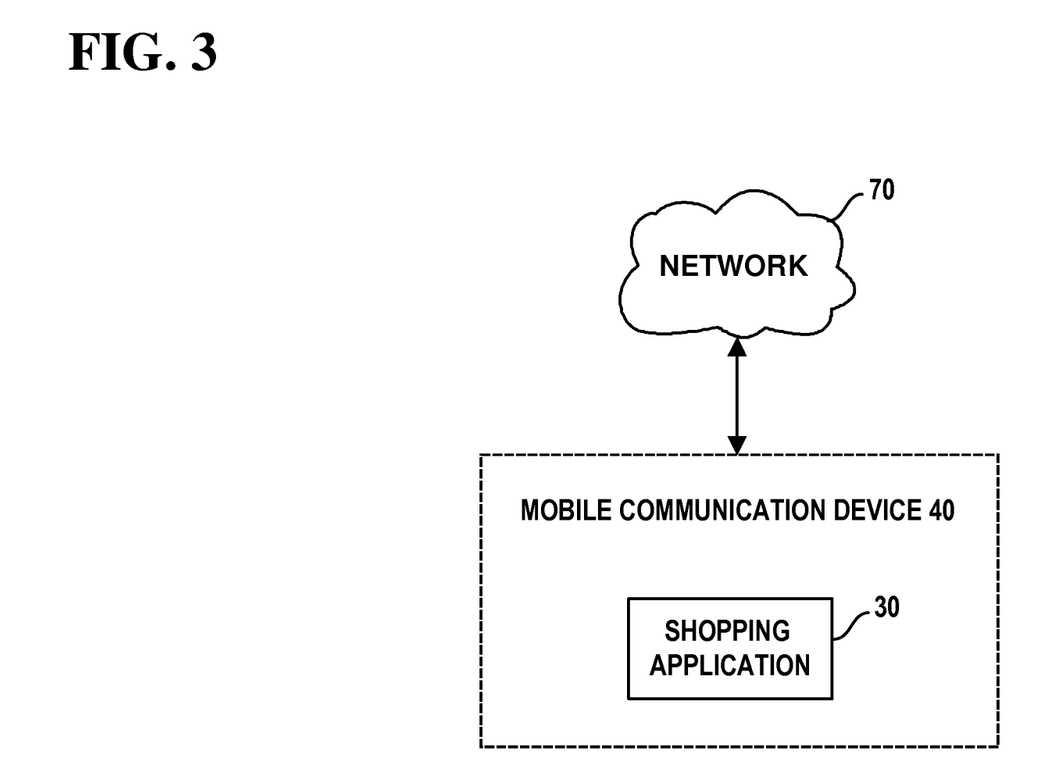
FIG. 3 illustrates a block diagram of an example mobile communication device of the transaction system.

With reference to FIG. 3, mobile communication device 40 includes a processor, memory, and program and data storage. Mobile communication device 40 may execute an operating system, such as a Microsoft, Google, or Apple operating system. Mobile communication device 40 may execute other computer software that may be stored in a computer readable medium, such as a memory. For example, Mobile communication device 40 may execute web browser software to display web pages from server 20, including transaction web page 28.

Mobile communication device 40 also executes shopping application 30, which connects via network 70 to server 20. In an example embodiment, shopping application 30 may connect to server 20 through web service software of server 20 for this purpose. During a transaction, shopping application 30 obtains transaction details such as item descriptions, produce weights, and prices from server 20 and displays them for the customer so that the customer may follow along as items are processed. Shopping application 30 also interacts with server 20 to complete payment and obtain a digital receipt.

Mobile communication device 40 further includes graphics circuitry for connecting to a display, network circuitry, such as cellular and wireless network circuitry (wifi), for connecting to network 70, and other circuitry for connecting to other peripherals, such as an input device (e.g., a touch overlay to the display).

Mobile communication device 40 may include, but not be limited to, a smart phone, personal digital assistant, tablet computing device, or other portable communication device. Mobile communication device 40 may be provided and/or owned by the customer.

Mobile communication device 40 may download shopping application 30 from a website hosted by server 20. In one example embodiment, shopping application 30 may be written in a programming language such as the Java programming and be hosted within the browser software executed by mobile communication device 40.

As another example, shopping application 30 may include a script, such as JavaScript, combined with hypertext markup language (HTML) or other suitable web page language.

As another example, shopping application 30 may include a software applet written to be executed within the operating system of the smart phone.

Figure 4:
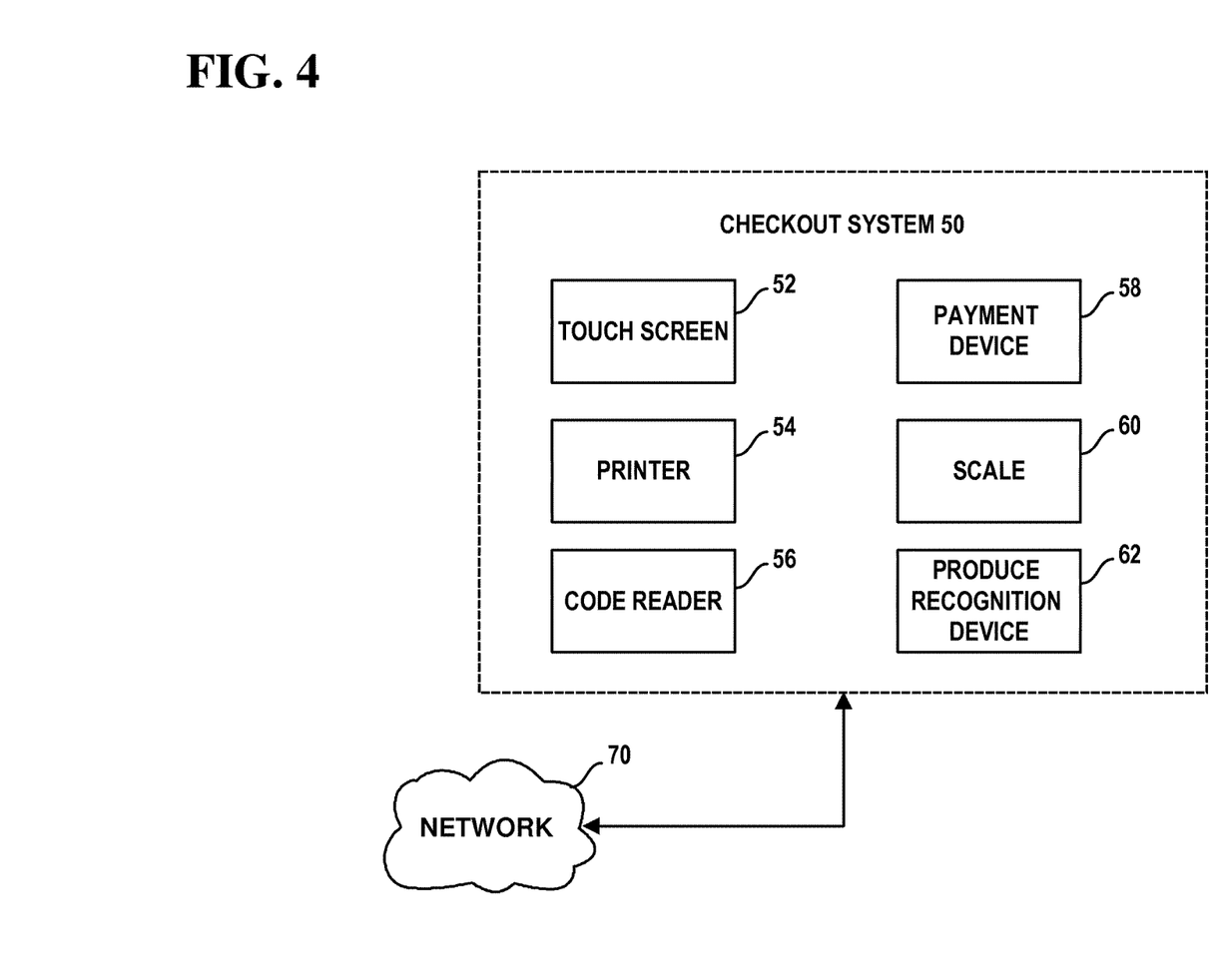
FIG. 4 illustrates a block diagram of an example checkout system of the transaction system.

With reference to FIG. 4, checkout system 50 at a checkout station primarily includes code reader 56. Code reader 56 includes a processor, memory, and program and data storage. Code reader 56 reads a code on an item presented by a customer during a transaction, obtains item identification information from the code, and stores the identification information in a record on the server in a format accessible to mobile communication device 40.

Code reader 56 may include a barcode reader and/or radio frequency identification tag reader. An example barcode reader may include one or more cameras for imaging scanning, a laser for laser scanning, or a combination of the two technologies.

Code reader 56 may be directly coupled to network 70 as a network device. For this purpose, code reader 56 includes its own network circuitry and its own network address, such as its own Internet Protocol (IP) address. No transaction terminal between code reader 56 and network 70 is necessary.

Code reader 56 may include circuitry for connecting peripherals having their own processors, memory, program and data storage in various envisioned configurations. This circuitry may include Universal Serial Bus (USB) circuitry.

Alternatively, peripherals in various configurations may each include network circuitry and network addresses for connecting to network 70 individually. Their association together as a single point of service could be managed by any of transaction software 22, transaction web page 28, security software 32 or other software on server 20.

In one example configuration, checkout system 50 may include touch screen 52 to display transaction screens, record customer selections and display item descriptions, weights, and prices to accommodate customers who are not using mobile communication devices to display screens and make selections as part of their transactions.

In another example configuration, checkout system 50 may include a scale 60 for weighing produce items, which may be built-in to code reader 56.

In another example configuration, checkout system 50 may further include a produce recognition device 62 for identifying produce.

In another example configuration, checkout system 50 may include printer 54 for printing receipts for customers who select paper receipts.

In another example configuration, checkout system 50 may include payment device 58 for accepting payment from customers who select an alternate payment method. Payment device 58 may include one or more of a card reader, a keypad for entering personal identification numbers (PINs) during debit card payment, and a near field communications (NFC) reader for wirelessly receiving payment from mobile communication device 40 or NFC-enabled payment cards.

Figure 5:
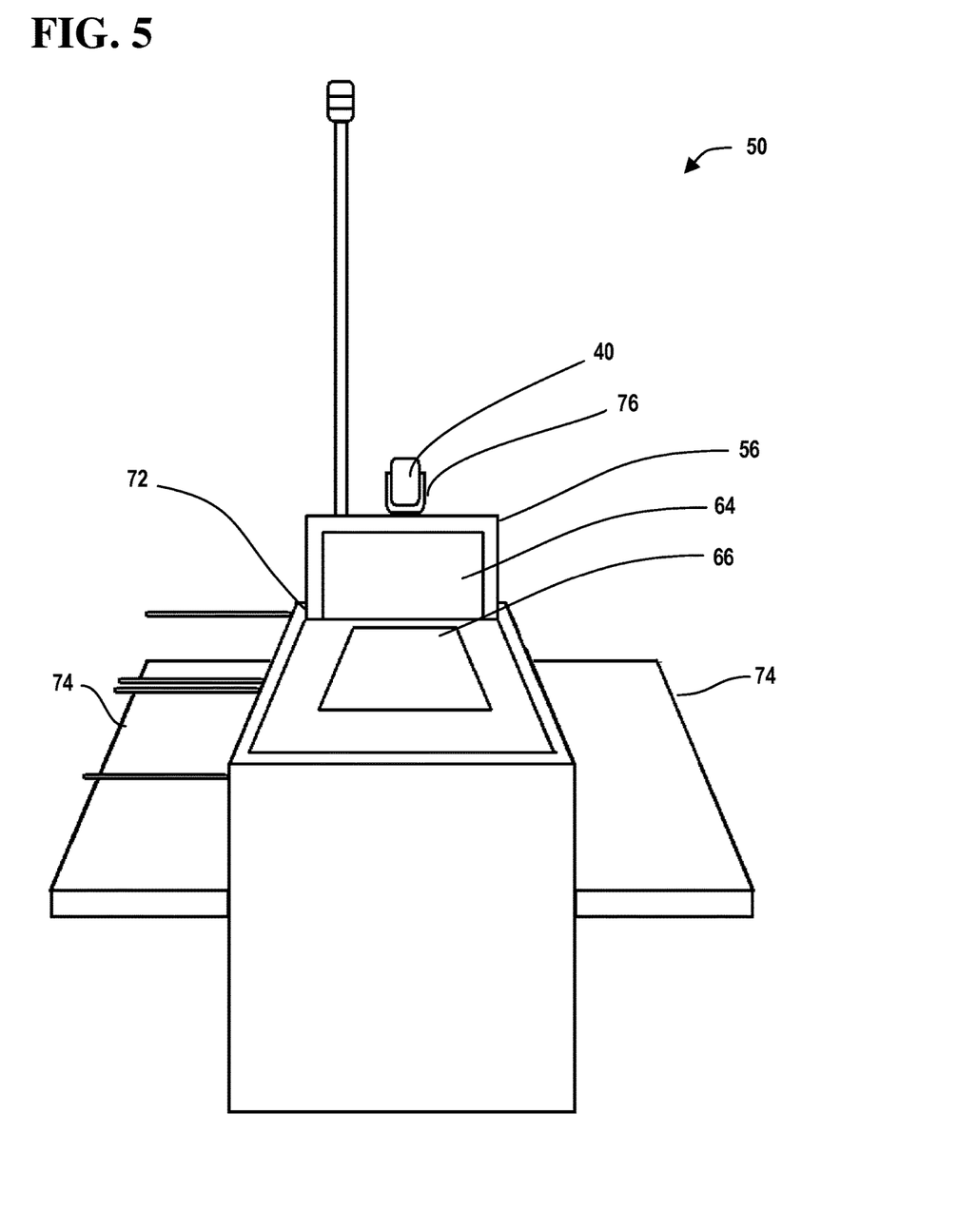
FIG. 5 illustrates an example embodiment of a checkout system.

Referring now to FIG. 5, an example checkout system 50 is illustrated. Example checkout system 50 includes checkstand 72 with shelves 74 for placing items to be scanned and items that have been scanned.

Checkstand 72 further includes code reader 56. Code reader 56 includes a multi-aperture barcode reader having a substantially vertical aperture 64 for reading barcodes from a plurality of first directions and a substantially horizontal aperture 66 for reading barcodes from a plurality of second directions. The multi-aperture barcode reader may include one or more cameras for imaging scanning, a laser for laser scanning, or a combination of the two technologies.

Checkstand 72 further includes a dock 76 for mounting mobile communication device 40 to allow a customer to use both hands for scanning and bagging items.

Figure 6:
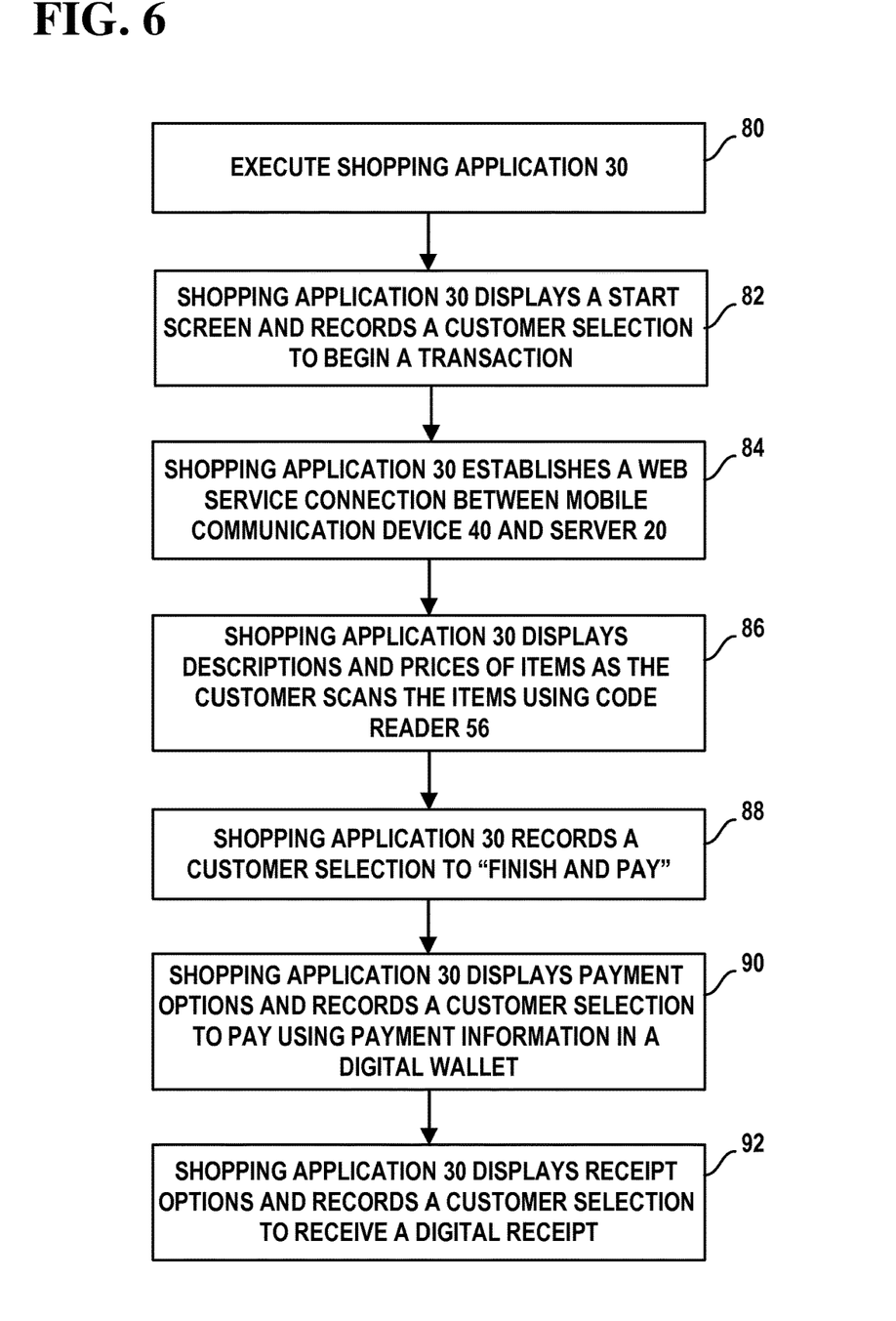
FIG. 6 illustrates an example transaction method.

Referring now to FIG. 6, an example transaction method begins with step 80, in which a customer opens transaction web page 28 to execute shopping application 30.

In step 82, shopping application 30 displays a start screen and records a customer selection to begin a transaction at a checkout lane.

In step 84, shopping application 30 establishes a web service connection between mobile communication device 40 and server 20.

In step 86, shopping application 30 displays descriptions and prices of items as the customer scans each of the items using code reader 56.

Transaction software 22 at server 20 receives item identification information from code reader 56, determines prices of the items from price lookup data 26 using the item identification information, and provides the item descriptions and prices to shopping application 30.

In step 88, shopping application 30 records a customer selection to "finish and pay".

In step 90, shopping application 30 displays payment options and records a customer selection to pay using payment information in a digital wallet within mobile communication device 40. Alternatively, the customer may select an option to pay using payment device 58.

Transaction software 22 at server 20 receives the payment information from mobile communication device 40 and returns an indication that payment was successfully processed.

In step 92, shopping application 30 displays receipt options and records a customer selection to receive a digital receipt. Alternatively, the customer may select an option to receipt a printed receipt using printer 54.

Transaction software 22 at server 20 receives the request and provides a receipt to mobile communication device 40 or to printer 54.

Shopping application 30 closes the web service connection. Transaction software 22 closes the transaction and may then delete transaction record 24.

Customer interaction with a transaction server 20 using a mobile communication device 40 may be applied to other checkouts systems, including full-service checkout systems.

Although the present invention has been described with particular reference to certain preferred embodiments thereof, variations and modifications of the present invention can be effected within the spirit and scope of the following claims.

What is claimed is:

1. A processor-implemented method programmed in a non-transitory processor-readable medium and to execute on one or more processors of a mobile communication device, a code reader, and a transaction server, the mobile communication device, the code reader, and the transaction server are configured to execute the method, comprising:
   docketing the mobile communication device into a checkout station having the code reader integrated into the checkout station, and the code reader is interfaced over a network connection and the transaction server;
   establishing by the mobile communication device a connection with the transaction server responsive to the docketing and during a transaction at the checkout station;
   scanning, by the code reader of the checkout station, codes of items being processed during the transaction as the items are passed over the code reader, wherein the code reader is a combination camera and laser code reader, and providing, by the code reader, the codes to the transaction server during the transaction;
   receiving, by the mobile communication device, item descriptions and prices associated with items purchased during the transaction from the transaction server as the customer scans the items at the checkout station and operates the code reader of the checkout station; and
   displaying, by the mobile communication device, the item descriptions and prices on a display of the mobile device, wherein the display of the mobile communication device providing an interface having transaction screens for the transaction at the checkout station, and wherein the checkout station lacks a checkout station display for the checkout station and the mobile communication device providing the display while docketed into the checkout station.

2. The method of claim 1, further comprising:
   providing by the mobile communication device payment for the items.

3. The method of claim 2, wherein the providing comprises providing payment information from a digital wallet of the mobile communication device.

4. The method of claim 2, further comprising:
   receiving by the mobile communication device a receipt from the server.

5. The method of claim 1, wherein the connection comprises a web service connection.

6. The method of claim 1, wherein the transaction comprises a self-service checkout transaction.

7. A processor-implemented method programmed in a non-transitory processor-readable medium and to execute on one or more processors of a server, a mobile communication device, and a code reader configured to execute the method, comprising:
   establishing by the server a connection with the mobile communication device during a transaction involving a customer when the mobile communication device is docked into a checkout station that has the code reader integrated within the checkout station, and providing a transaction display and an interface for processing the transaction through a display of mobile communication device, wherein the transaction display providing transaction screens generated by the interface for the transaction at the checkout station, and wherein the checkout station lacks a checkout station display and the mobile communication device providing the display as the transaction display for the transaction;
   receiving by the server item descriptions associated with items purchased during the transaction from the code reader of the checkout station as the items are scanned by the code reader when the customer passes the items over the code reader while the mobile communication is docked in the checkout station, wherein the code scanner is a combination camera and laser code reader and the code reader performs scanning of the items at the checkout station and the code reader integrated into the checkout station;
   sending by the server prices of the items and the item descriptions to the mobile communication device for display by the mobile communication device on the display of the mobile communication device; and
   receiving payment by the server from the customer for the items through customer interaction with the interface provided with the transaction display and presented in the display of the mobile communication device.

8. The method of claim 7, wherein receiving payment comprises receiving payment from a digital wallet of the mobile communication device.

9. The method of claim 7, wherein receiving payment comprises receiving payment from a card reader located with the code reader.

10. The method of claim 7, further comprising:
    sending a digital receipt to the mobile communication device a receipt from the server.

11. The method of claim 7, further comprising:
    sending a digital receipt to a printer for printing at the location of the code reader.

12. The method of claim 7, wherein the connection comprises a web service connection.

13. A self-service checkout system comprising:
    an item identifier integrated into a checkout station of the self-service checkout system, the item identifier including:
      network circuitry configured with a network address, wherein the network circuitry couples the item identifier to a server through a network without an intermediary computer;
      at least one processor; and
      at least one memory comprising computer program code, the at least one memory and the computer program code configured to, with the at least one processor, cause the item identifier to at least:
      capture information about an item presented by a customer during a transaction at the self-service checkout system as the item is passed over the item identifier by the customer, and the item identifier scans and reads the information at the checkout station;

obtain item identification information from the information captured and processed by the item identifier; and store the item identification information in a server record accessible to a mobile communication device of the customer that is docked at the checkout station and the mobile communication device provides an interface for the self-service checkout system through a display of the mobile communication device that operates as a transaction display for the self-service checkout system, wherein the display of the mobile communication device provides transaction screens generated by the interface for the transaction at the self-service checkout system, and wherein the checkout station lacks a checkout station display and the mobile communication device provides the transaction display as the display of the mobile communication device, wherein the item identifier is integrated into the checkout station and operated by the customer to scan the item during checkout when the customer passes the item over the item identifier.

14. The checkout system of claim 13, wherein the item identifier comprises a barcode reader.

15. The checkout system of claim 13, wherein the item identifier comprises a radio frequency identification tag reader.

16. The checkout system of claim 13, wherein the item identifier comprises a produce recognition device.

17. The checkout system of claim 13, further comprising item shelves.

18. The checkout system of claim 13, further comprising a dock for the mobile communication device to dock at the self-service checkout system.

19. The checkout system of claim 13, further comprising a peripheral device including other network circuitry configured with another network address, wherein the other network circuitry couples the peripheral device to the server through the network without the intermediary computer.

20. The checkout system of claim 13, wherein the item identifier further comprises communication circuitry and a peripheral device coupled to the item identifier through the communication circuitry.

* * * * *